Patented Oct. 19, 1954

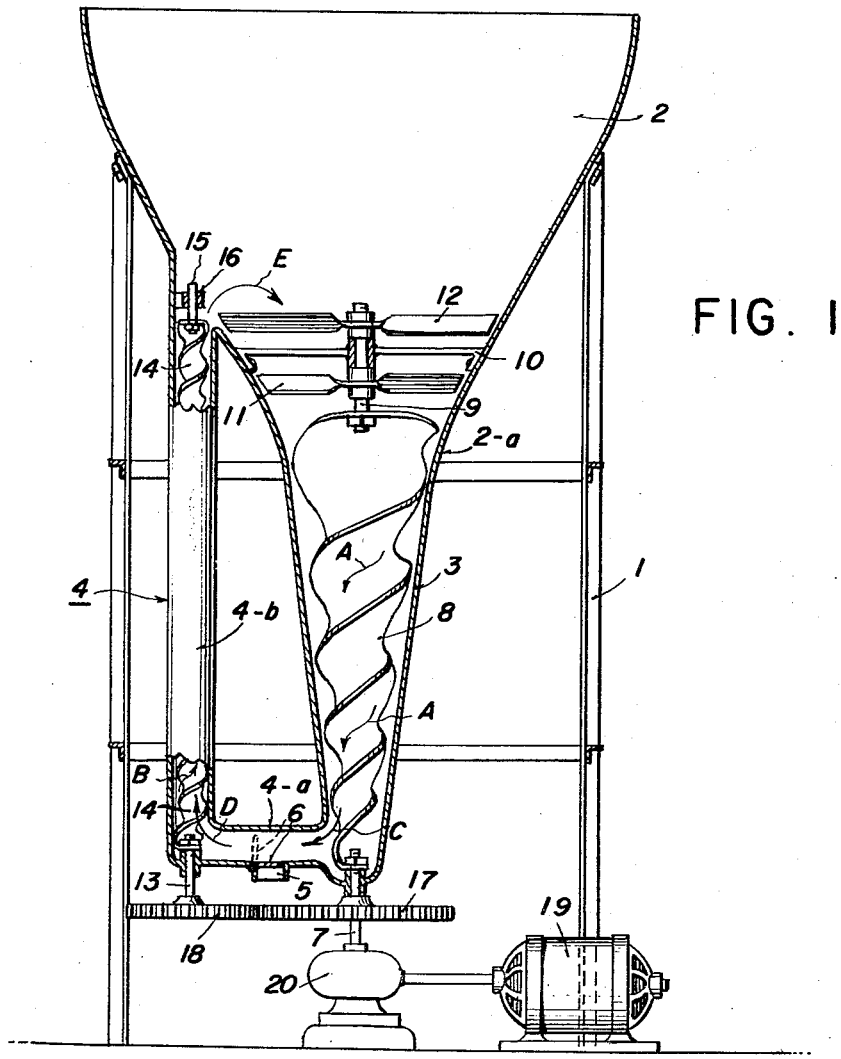

2,692,124

UNITED STATES PATENT OFFICE 2,692,124

MACHINE FOR KNEADING DOUGH

Fausto Celorio Mendoza, Mexico City, Mexico

Application September 5, 1952, Serial No. 308,001

2 Claims. (Cl. 259—97)

My invention consists in a new and useful improvement in machines for kneading dough. The particularly novel and useful feature of my improved machine is the combination of a hopper, a vertical trough, means for feeding the dough downwardly from the hopper and through the trough and means for feeding the dough upwardly from the bottom of the trough to the hopper. This combination provides means to maintain circulation of the dough through the machine. Another valuable feature is a controlled discharge conduit which functions to determine the re-circulation and discharge of the dough, whereby the amount of pressure exerted on the dough may be accurately controlled.

While I have illustrated in the drawing and hereinafter fully describe one specific embodiment of my invention, it is to be distinctly understood that I do not consider my invention to be limited to said embodiment but refer for its scope to the claims appended hereto.

In the drawing:

Fig. 1 is a side elevation, partly in section, of my improved machine.

Fig. 2 is a fragmentary, enlarged section of the discharge conduit and a valve therefor.

As illustrated in the drawing, my improved machine has a suitable frame 1 in which is mounted a hopper 2 in the form of an inverted conical frustum, the lower end 2-a of which merges into an inverted conical trough 3 integral with the hopper 2. A conduit 4 connects the lower end of the trough 3 with the lower portion of the hopper 2. The conduit 4 has a horizontal portion 4-a communicating with the trough 3 and a vertical portion 4-b communicating with the hopper 2. The portion 4-a has a discharge conduit 5 provided with a valve 6 adapted to close the conduit 5, as shown in Fig. 1 and to close the conduit 4 as shown in Fig. 2. The valve 6 is provided with any suitable adjusting means (not shown).

Suitably journaled in the bottom of the trough 3, there is a shaft 7 carrying a conical worm 8 projecting upwardly from the bottom of the trough 3 into the lower portion of the hopper 2 and having mounted on its upper end a shaft 9 co-axial with shaft 7 and journaled in a bearing 10 mounted in the hopper 2. The shaft 9 carries pairs of blades 11 and 12 disposed on each side of the bearing 10, respectively.

A shaft 13 is suitably journaled in the lower end of the portion 4-b of the conduit 4 and carries a cylindrical worm 14 projecting upwardly through the portion 4-b to the junction of the conduit 4 and the hopper 2. The worm 14 has mounted on its upper end a shaft 15 co-axial with shaft 13 and journaled in a bearing 16 mounted in the hopper 2.

The shafts 7 and 13 are provided with intermeshing gears 17 and 18, respectively. The shaft 17 is driven by a motor 19 through a reducer 20.

It is obvious (Fig. 1) that the parts are so related that shaft 7 drives worm 8 in the direction indicated by the arrows A, to convey the dough downwardly in the trough 3 and that the shaft 13 drives worm 14 in the direction indicated by the arrow B, to convey the dough upwardly through the portion 4-b of the conduit 4. The dough conveyed to the bottom of the trough 3 by the worm 8 passes from the trough 3 into the conduit 4, as indicated by the arrow C and, if the valve 6 closes the discharge conduit 5 as shown in Fig. 1, the dough will be supplied to worm 14 as indicated by the arrow D and returned into hopper 2 as indicated by the arrow E. If the valve 6 is fully opened, as shown in Fig. 2, closing the conduit 4 and opening conduit 5, the dough will be discharged from the machine. Should the valve 6 be positioned intermediate the two positions shown in Figs. 1 and 2, respectively, the dough passing out of the trough 3 will be divided, one fraction being discharged through conduit 5 and the other being returned by worm 14 to the hopper 2. In this manner, it is possible by proper adjustment of the valve 6 to exactly regulate the kneading and discharge of the dough. If desired, the machine may be provided with an additional valve for closing the conduit 5 when the valve 6 closes the conduit 4, only partially.

While the embodiment shown and described has a trough 3 which is conical, it is to be understood that the trough may be cylindrical, rectangular in cross-section, or have other cross-sectional configurations, the worm 8 being shaped to conform.

The foregoing description of the structure and operation of my novel machine shows its manifest advantages over known types of kneading machines. In such known types the trough is horizontal and the blades have to lift the mass of dough, requiring heavy equipment and excessive power. Using such machines, it is difficult and at times impossible to obtain a uniform mixture of the ingredients of the dough, as the mass has a tendency to remain along the horizontal bottom portion of the trough.

In my improved machine, the weight of the mass assists the continuous circulation and production of proper mixture, so that the mass is uniform throughout, all of its ingredients being properly distributed therethrough.

The control of the degree of pressure exerted by the machine on the mass is a feature of very great value since the pressure can be suited to the character of the particular mass being treated. For example, corn meal for which the machine is well suited, being less pulverized than wheat flour, requires greater pressure to cause penetration of water or other liquid ingredients to produce dough of excellent quality. I have found by actual experience that my machine produces compact dough, made with corn meal, which can not be made by machines of the known types.

Having described my invention, what I claim is:

1. In a device for kneading dough, the combination of a hopper; a trough connected with said hopper; a shaft journaled in the bottom of said trough; a worm mounted on said shaft and extending through said trough; a second shaft mounted on said worm, coaxially with said first shaft and projecting into said hopper; a plurality of blades on said second shaft in said hopper; a conduit connecting the lower end of said trough with said hopper; a third shaft journaled in said conduit; a second worm in said conduit, mounted on said third shaft and extending into said hopper; a fourth shaft mounted on said second worm, co-axially with said third shaft and journaled in said hopper; and means adapted to drive said first and third shafts to so rotate said first worm as to convey the dough from said hopper, through said trough into said conduit, and to so rotate said third shaft as to convey the dough through said conduit into said hopper.

2. In a device for kneading dough, the combination of a hopper; a trough depending from and connected with said hopper; a worm extending through said trough; a plurality of blades on said worm in said hopper; a conduit connecting the lower end of said trough with said hopper; a second worm in said conduit extending into said hopper; and means adapted to drive said worms to so rotate said first worm as to convey the dough from said hopper, through said trough, into said conduit, and to so rotate said second worm as to convey the dough through said conduit into said hopper.

References Cited in the file of this patent

UNITED STATES PATENTS

| Number | Name | Date |
|---|---|---|
| 1,467,715 | Donkers | Sept. 11, 1923 |

FOREIGN PATENTS

| Number | Country | Date |
|---|---|---|
| 732,590 | France | Sept. 22, 1932 |